Feb. 23, 1932. M. H. TONCRAY ET AL 1,846,374
SEAT
Filed June 3, 1927  3 Sheets-Sheet 1
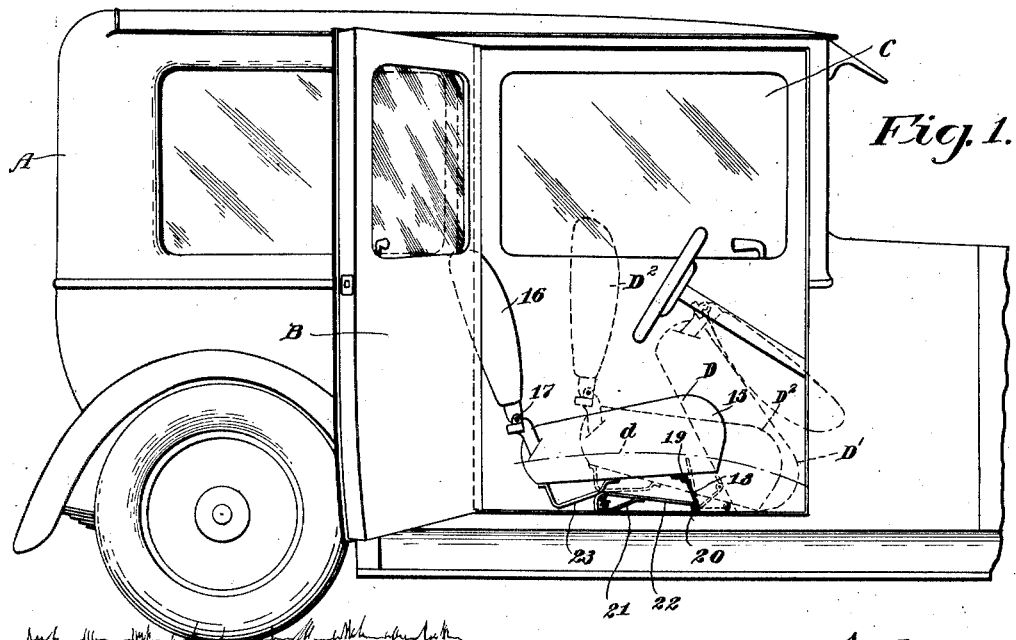
Fig. 1.
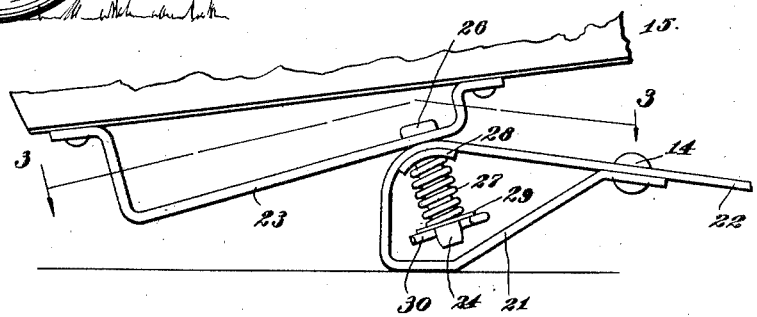
Fig. 2.
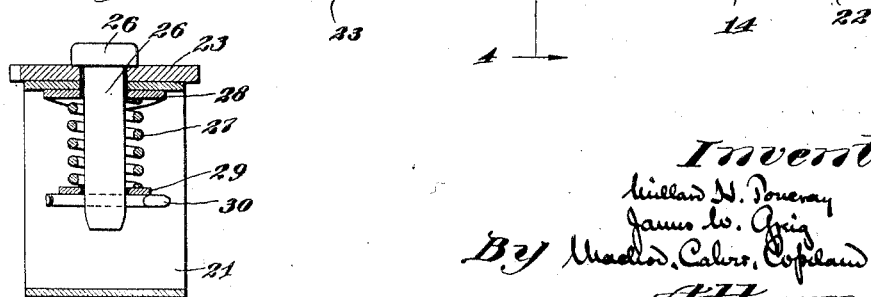
Fig. 3.
Fig. 4.
Inventors Feb. 23, 1932.   M. H. TONCRAY ET AL   1,846,374
SEAT
Filed June 3, 1927   3 Sheets-Sheet 2
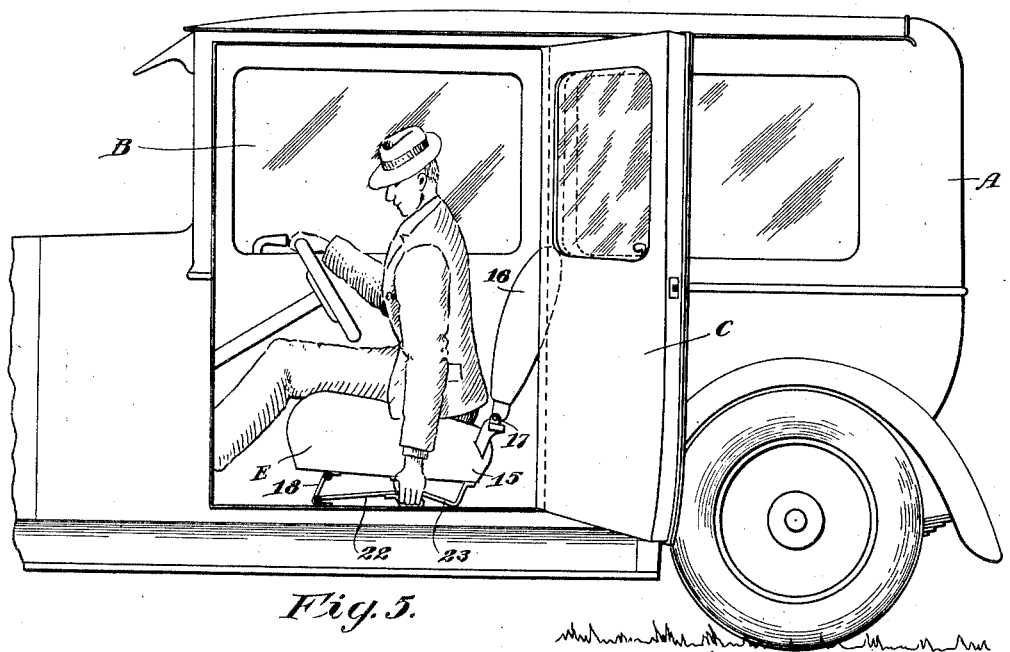
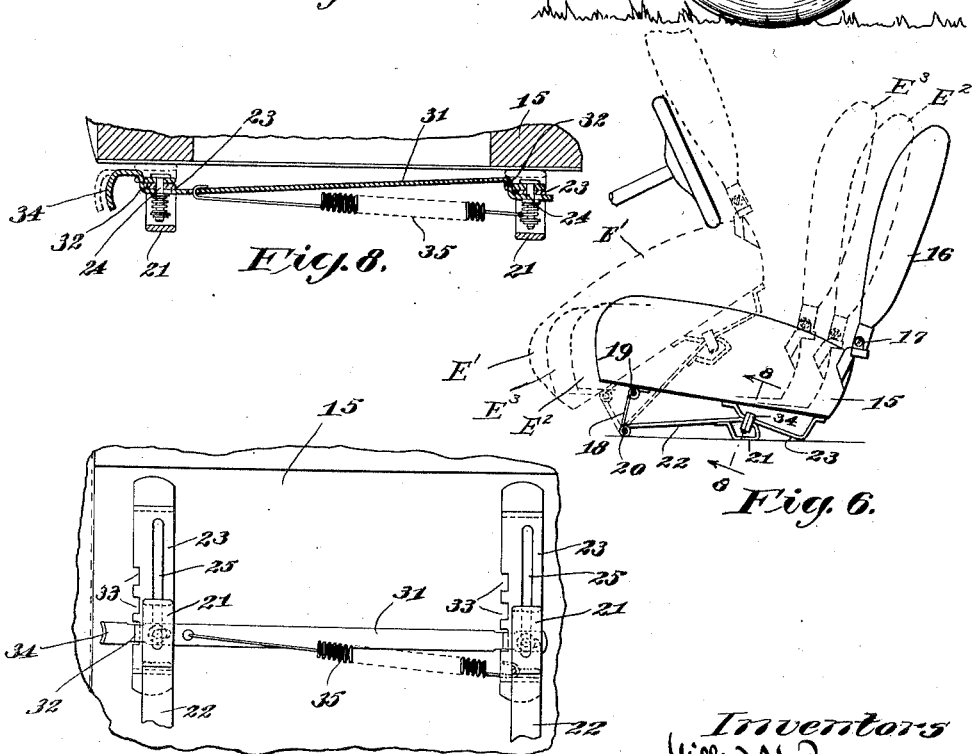

Feb. 23, 1932.  M. H. TONCRAY ET AL  1,846,374
SEAT
Filed June 3, 1927   3 Sheets-Sheet 3
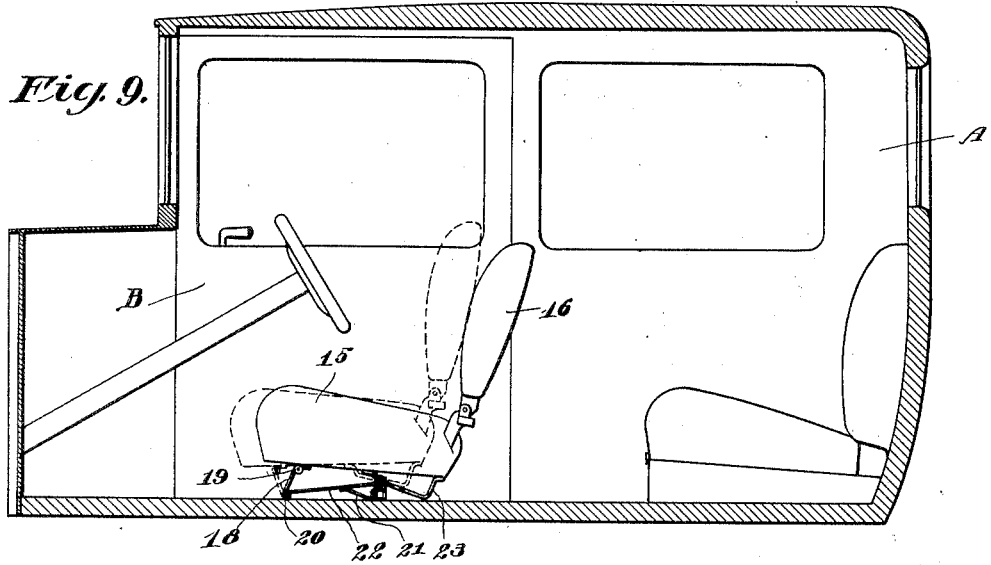
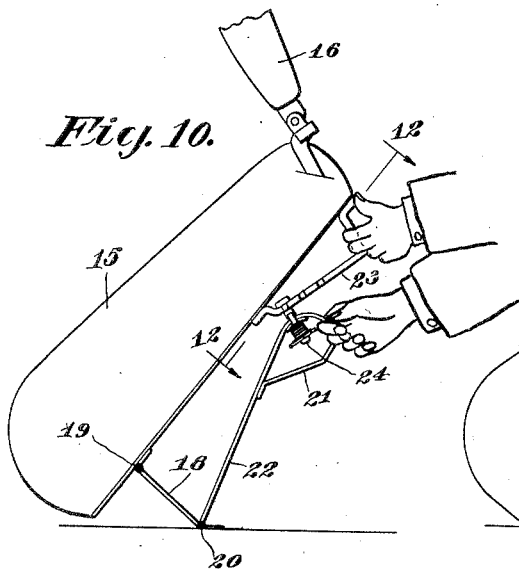
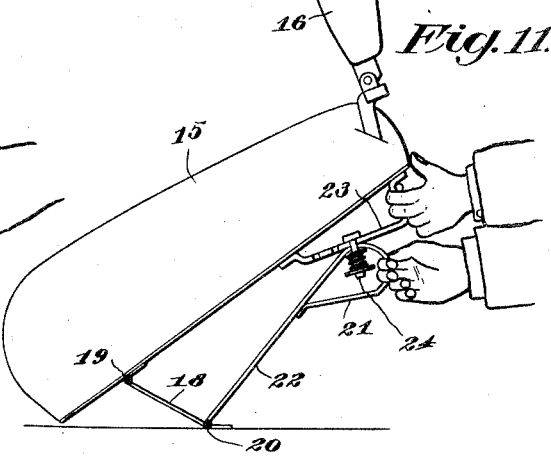
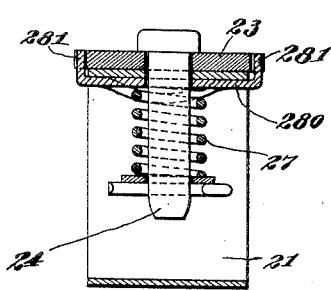
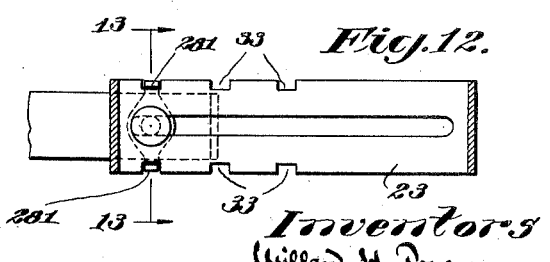

Patented Feb. 23, 1932

1,846,374

UNITED STATES PATENT OFFICE

MILLARD H. TONCRAY AND JAMES W. GREIG, OF DETROIT, MICHIGAN, ASSIGNORS TO HUDSON MOTOR CAR COMPANY, OF DETROIT, MICHIGAN, A CORPORATION OF MICHIGAN

SEAT

Application filed June 3, 1927. Serial No. 196,369.

This invention relates to seats for automobile bodies, and especially, although not exclusively, to seats for closed bodies of the type known as coaches. A body of the latter type has two forwardly located doors at opposite sides respectively of the vehicle, a bench seat at the rear, and two forward seats disposed opposite the doors respectively, one of said forward seats being the driver's seat and the other being a passenger's seat. Since these forward seats are located immediately adjacent the doors and normally obstruct the latter, it is necessary that they, or at least the passenger's seat, be of such a character as to be movable out of the way of the door or doors in order to permit the occupants of the rear seat to enter and leave the vehicle. This is especially true in view of the fact that, in order to provide a forward seat of comfortable design, and at the same time keep the door openings within reasonable limits as to size, the back of the forward seat must normally extend rearwardly to or beyond the rear edge of the door opening. As heretofore constructed these forward seats have usually been of the hinged or folding type requiring the driver or the forward passenger (usually the latter) to get out in order to permit his seat to be folded or otherwise swung out of the way whenever an occupant of the rear seat wished to enter or leave the car. The present invention has for an object to provide an improved seat of such construction that an occupant thereof can, without getting up, and with a minimum of effort, move the same into a position affording a maximum unobstructed space between the back thereof and the rear edge of the door opening, said construction however being such that the seat, when occupied, is stably supported in its normal position against accidental shifting, a deliberate, although easily performed, act on the part of its occupant being necessary in order to move it.

It is also desirable that the driver's seat be capable of adjustment with respect to the several controls in accordance with the physical build of different drivers in order that any particular individual may occupy the driving position most comfortable and convenient for him, and also to permit the same driver to change his position from time to time in accordance with driving conditions or to prevent fatigue. Thus, for example, a driver may wish to assume a semi-reclining position when driving over long stretches of lightly travelled roads, but to assume a more upright position when heavy traffic is encountered. The present invention has therefore for another object to provide a seat which can be quicky and easily adjusted into any one of a plurality of positions, preferably by the occupant thereof without leaving the same, and which can be securely locked and retained in adjusted position against accidental movement.

A further object of the invention is to provide a seat of simple and standardized construction which can, by slight modification, as by the provision, omission, or substitution of a simple part or parts, be readily adapted to either of the purposes above referred to.

The foregoing and other objects of the invention, together with means whereby the latter may be carried into effect, will best be understood from the following description of a preferred embodiment thereof illustrated in the accompanying drawings. It will be understood, however, that the particular constructions described and shown have been chosen for purposes of exemplification merely, and that the invention, as defined by the claims hereunto appended, may be otherwise embodied without departure from the spirit and scope thereof.

In said drawings:

Fig. 1 is a side elevation of a portion of an automobile of the coach type showing the adjacent door open and illustrating the movement of the passenger's seat.

Fig. 2 is an enlarged fragmentary side elevation of one of the rear supports for the seat shown in Fig. 1 and the connection between said support and the seat bottom.

Fig. 3 is a section taken substantially on the line 3—3, Fig. 2.

Fig. 4 is a further enlarged detail section taken substantially on the line 4—4, Fig. 3.

Fig. 5 is a view similar to Fig. 1 looking from the opposite side and illustrating the mode of adjustment of the driver's seat.

Fig. 6 is a detail side elevation of the driver's seat illustrating different positions of adjustment.

Fig. 7 is a fragmentary bottom plan view on an enlarged scale of the driver's seat.

Fig. 8 is an enlarged transverse section taken substantially on the line 8—8, Fig. 6.

Fig. 9 is a view similar to Fig. 5, but with the body in section, showing a modified construction of driver's seat.

Figs. 10 and 11 are diagrammatic side elevations illustrating the method of adjusting the seat shown in Fig. 9.

Fig. 12 is an enlarged detail section taken substantially on the line 12—12, Fig. 10.

Fig. 13 is a further enlarged detail section on the line 13—13, Fig. 12.

In Figs. 1 and 5 is shown an automobile body A of the coach type having right and left forwardly located doors B and C, a passenger's seat D adjacent the door B, and a driver's seat E adjacent the door C. Except as hereinafter explained, the seats D and E are identical in construction and each comprises a seat bottom 15 having a back 16 hinged thereto at 17, a suitable adjustable stop being, if desired, employed to fix the inclination of the back, as is usual in seats of this type. The backs 16 of the seats D and E normally extend to or beyond the rear edges of the door openings, as shown in Fig. 1, so that said seats completely obstruct the door openings so far as passage to and from the rear of the body is concerned, and it has accordingly been customary to hinge such seats adjacent their forward edges to the floor to permit them to be swung out of the way, as indicated by the dotted line positions $D^1$, Fig. 1, and $E^1$, Fig. 6. This makes it necessary for an occupant of the seat to leave the same and step out of the car whenever a rear seat passenger wishes to enter or leave. In accordance with the present invention, the seats, particularly the passenger's seat D, are so supported as to permit movement thereof, while occupied, from their normal position into the dotted line position $D^2$ Fig. 1, which provides a passage to the rear of the body between the back of the seat and the rear edge of the door opening.

To this end the forward edge of the seat bottom 15 is supported upon a strut 18 hinged at its upper end at 19 to the underside of the said bottom adjacent the forward edge of the latter and also hinged at its lower end at 20 to the car floor. The strut 18 is preferably substantially straight, as shown, and may comprise a single flat plate extending transversely of the seat, although, if preferred, two separate members located respectively adjacent the opposite sides of the seat may be employed.

At its rear the seat bottom 15 rests upon supports 21 connected by links 22 with the strut 18 below the upper end of the latter, the forward ends of said links 22 being preferably hinged to the car floor co-axially with the hinge 20. Preferably, and as herein shown, the rear ends of the links 22 are bent upon themselves and riveted at 14 to form open loops which constitute the supports 21. The links 22 constitute base members pivotally connected at their front ends to the floor of the vehicle under the front edge or end of the seat, said members having also movable supporting connections with the seat adjacent its rear edge or end. To the latter end, in the construction shown, the supports 21 have a limited sliding engagement with guides 23 secured to the underside of the seat bottom 15 adjacent the rear end of the latter and at opposite sides, said guides 23 being preferably upwardly and forwardly inclined as shown. The supports 21 are connected with the guides 23 by studs 24 which pass through openings in the tops of said supports and through slots 25 in the guides 23 and are formed with heads 26 above the latter. Each stud 24 is preferably provided with a spring 27 interposed between washers 28 and 29 bearing respectively against the underside of the top of the support 21 and a pin 30 passing through the stud 24 adjacent the lower end of the latter.

The normal position of the seat D is shown in full lines in Fig. 1, the strut 18 being slightly inclined upwardly and rearwardly and the studs 24 being in the forward ends of the slots 25. It will be seen that with the parts in this position the weight of an occupant on the seat tends to hold the latter stable, since the strut 18 is in the rear of its dead center position and the inclination of the guides 23 also tends to resist forward movement, while further rearward movement is prevented by engagement of the studs 24 with the forward ends of the slots 25. It will, however, also be seen that the passenger, by grasping the bottom ledge of the windshield opening or other convenient fixed part of the car, can draw himself and the seat forwardly into the dotted line position $D^2$ shown in Fig. 1. During this movement the strut 18 swings forwardly about the axis of the hinge 20 through and beyond the dead center poistion, while the guides 23 ride upwardly and forwardly on the supports 21. The seat, therefore, slides bodily forwardly and also swings forwardly about the axis of the hinge 20, the sliding movement being determined by the guides 23 whose inclination gives an upward component to the forward movement of the rear edge of the seat, while the swinging movement of the strut 18, after passing dead center, gives a downward component to the front edge of the seat, so that the seat as a whole moves in the approximately arcuate path indicated by the broken line $d$ in Fig. 1. Not only, therefore, is the seat moved bodily forwardly away from the rear edge of the door opening, but the seat back 16 is further swung forwardly, thereby affording adequate space to permit passengers to pass between said back and the rear edge of the door opening to and from the rear of the body.

As above stated, the driver's seat E is substantially identical in construction with the passenger's seat D but is preferably provided with means for securing the same in any one of a plurality of positions of adjustment, as, for example, those indicated respectively in Fig. 6 by the full line position and the dotted line positions $E^2$ and $E^3$. Said securing means as shown in Figs. 7 and 8 comprises a laterally sliding latch bolt 31 interposed between the washers 28 and the tops of the supports 21 and having adjacent its ends slots to receive the pins 24, said bolt also having shoulders 32 to engage notches 33 in the guides 23. The latch bolt 31 is formed at the outer side of one of the supports 21, herein the left support, with an operating handle 34 and is connected with the other support by a spring 35 tending normally to hold the shoulders 32 seated in the notches 33.

It will be seen that with the shoulders 32 of the bolt 31 engaged with notches 33 in the guides 23 the seat is effectually locked against longitudinal movement either on the guides 23 or about the axes of the hinges 19 and 20, since the strut 18, link 22, and seat bottom at this time constitute a triangular frame or truss which is rigid notwithstanding its articulated structure. It will also be seen, however, that the driver can at any time, and without leaving his seat, by reaching downwardly as shown in Fig. 5 and grasping the handle 34, draw the latch bolt 31 into the latch releasing position shown in dotted lines in Fig. 8, after which he can, by pushing or pulling himself and the seat rearwardly or forwardly, move said seat into a readjusted position in which it will be retained by the latch bolt when the latter is restored to the influence of its spring 35. It will further be seen that, if desired, the driver can, by unlatching his seat, slide the latter forwardly as far as permitted by the steering wheel, as above explained in connection with the passenger's seat, thereby permitting a rear seat passenger to enter or leave the vehicle through the left door.

It will be observed that the constructions above described do not in any way interfere with the swinging or folding of the seats about the axes of the hinges 20 into the inoperative positions $D^1$ and $E^1$ whenever it is, for any reason, desired to move or fold the seats in this manner, this operation being permitted by the pivotal connection of the base members or links 22 with the strut 18 and car floor under the front of the seat. It will also be observed that identically the same construction is, for the most part, employed in both the adjustable driver's seat and the shiftable passenger's seat, and that one may be converted into the other by the mere addition or omission of two simple parts, namely the latch bolt 31 and spring 35. It will, of course, be understood that in the case of the passenger's seat the notches 33 in the guides 23 are without function, and these may, if desired, be omitted, but for purposes of standardization, interchangeability, and reduction in the necessary number of different parts, it is preferred to use the same guides for both seats.

A construction requiring even less change in order to adapt the same to either a passenger's or a driver's seat is illustrated in Figs. 9 to 13. This construction is identical with that first described with the exception of the means for securing the driver's seat in adjusted position. As shown in Fig. 12, the guide 23 is provided on both its opposite edges with a series of notches 33 which are engaged by upturned ears 281 formed on a washer 280 which may be substituted for the washer 28 of the construction first described. In order to adjust this seat, it is tipped forwardly about the axis of the hinge 20 into the position shown in Fig. 10, and the support 21 grasped by the hand of the operator and drawn away from the guide 23 against the tension of the spring 27 to disengage the ears 281 from the notches 33. The parts may then be moved into a new position as shown in Fig. 11 and the ears 281 allowed to engage a different pair of notches 33, thereby locking the seat in readjusted position.

In this form of the invention identically the same construction may be adapted for use as a passenger's seat or a driver's seat merely by choosing a washer 28 or a washer 280 as the case may be. In this construction however the driver cannot readjust his seat without leaving it, so that, for purposes of convenience, the construction first described is preferred.

Having thus described our invention, we claim:

1. In a vehicle body, a seat, a swinging support for one edge of said seat upon which the latter is movable forwardly and rearwardly through a dead centre position, and a support for the opposite edge of said seat pivotally connected with said swinging support below the upper end of the latter.

2. In a vehicle body, a seat, a swinging support pivotally connected with one edge of said seat upon which the latter is movable forwardly and rearwardly through a dead centre position, and a support for the opposite edge of said seat having a limited sliding movement relative thereto in the direction of movement of said swinging support and also pivotally connected with said swinging support below the upper end of the latter.

3. In a vehicle body, a seat, a substantially straight supporting strut hinged at its upper end to said seat adjacent the forward edge of the latter and at its lower end to the floor of the body and normally occupying an upwardly and rearwardly inclined position, a guide secured near the rear edge of said seat and a support for the rear edge of said seat slidably connected with said guide.

4. In a vehicle body, a seat, a support hinged at its upper end to said seat adjacent the forward edge of the latter and at its lower end to the floor of the body, a guide secured to the rear edge of said seat, and a support slidably connected at its rear end with said guide and hinged at its forward end to the floor of the body coaxially with said first named support.

5. In a vehicle body, a seat, a support hinged at its upper end to said seat adjacent the forward edge of the latter and at its lower end to the floor of the body, a guide secured to the rear edge of said seat, a support slidably connected at its rear end with said guide and hinged at its forward end to the floor of the body coaxially with said first named support, and means for locking said last named support against sliding movement with respect to said seat.

6. In a vehicle body, a seat, a support hinged at its upper end to said seat adjacent the forward edge of the latter and at its lower end to the floor of the body, a guide secured to the rear edge of said seat, a support slidably connected at its rear end with said guide and hinged at its forward end to the floor of the body coaxially with said first named support, and means operable by an occupant of said seat, for locking said last named support against sliding movement with respect to said seat.

7. In a vehicle body, a seat, a support hinged at its upper end to said seat adjacent the forward edge of the latter and at its lower end to the floor of the body, a pair of parallel notched guides secured to the under side of said seat adjacent the rear edge thereof, supports slidably engaging said guides and pivotally connected with said first named support below the upper end of the latter, and locking means carried by said last named supports and cooperating with the notches in said guides.

8. In a vehicle body, a seat, a support hinged at its upper end to said seat adjacent the forward edge of the latter and at its lower end to the floor of the body, a pair of parallel notched guides secured to the under side of said seat adjacent the rear edge thereof, supports slidably engaging said guides and pivotally connected with said first named support below the upper end of the latter, and a laterally sliding spring pressed latch cooperating with the notches in both of said guides and accessible from the side of the seat.

9. In combination with the front seat of an automobile and the floor of the vehicle, means for supporting said seat from said floor including a pivoted strut for supporting the front end of the seat and a base member pivotally connected at its front end to the floor under the front end of the seat and having a movable supporting connection with the rear end of the seat.

10. In combination with the front seat of an automobile and the floor of the vehicle, means for supporting said seat from said floor including a pivoted strut for supporting the front end of the seat and a base member pivotally connected at its front end to the floor under the front end of the seat and having an upwardly and forwardly movable supporting connection with the rear end of the seat.

11. In a vehicle body, a seat, a substantially straight strut hinged at its upper end to said seat adjacent the forward edge of the latter and at its lower end to the floor of the body, and a support for the rear edge of said seat and a guide secured to the seat and cooperating with the support and with respect to which said support is relatively slidable.

12. In a vehicle body, a seat, a substantially straight strut hinged at its upper end to said seat adjacent the forward edge of the latter and at its lower end to the floor of the body, a support for the rear edge of said seat and a guide cooperating therewith and with respect to which said support is relatively slidable, one of said last-named elements being secured to said seat adjacent the rear edge thereof, and means associated with one of said members for limiting the rearward position of said seat.

In testimony whereof we affix our signatures.

MILLARD H. TONCRAY.
JAMES W. GREIG.